United States Patent [19]

Shaklee

[11] Patent Number: 6,023,557
[45] Date of Patent: Feb. 8, 2000

[54] PARALLEL SEGMENT PRINTING IN A PHOTOGRAPHIC PROCESS PRINTER

[75] Inventor: Kerry L. Shaklee, Brighton, Colo.

[73] Assignee: Sienna Imaging, Inc., Englewood, Colo.

[21] Appl. No.: 09/135,250

[22] Filed: Aug. 17, 1998

Related U.S. Application Data

[62] Division of application No. 08/639,976, Apr. 29, 1996.

[51] Int. Cl.[7] ................................................... G06F 15/00
[52] U.S. Cl. ........................... 395/105; 395/106; 395/111; 358/485; 358/507; 347/224; 347/226
[58] Field of Search .................................... 395/105, 106, 395/111, 112; 358/485, 487, 474, 507; 347/224, 226, 229, 230, 235; 348/776, 778, 779; 355/20

[56] References Cited

U.S. PATENT DOCUMENTS 5,084,656  1/1992  Sturm et al. ............................. 358/485
5,373,347  12/1994  Shaklee et al. ............................. 355/20
5,841,952  11/1998  Shaklee .................................... 395/105

*Primary Examiner*—Dov Popovici
*Assistant Examiner*—Mark Wallerson
*Attorney, Agent, or Firm*—James R. Young

[57] ABSTRACT

A photographic printer that uses a plurality of small CRTs, or multiple image segments displayed on a single CRT, to print wide format images. Within the printer, the multiple CRTs are positioned adjacent one another and display through lenses so that image segments displayed by adjacent CRTs join one another. The image segments of the single CRT also display through lenses, or mirrors and lenses, that join the segments. The printer may decompose each line of the image into horizontal image segments, or the printer may receive each image segment from a host computer system, and the printer displays the image segments on the CRTs such that they are exposed joined with one another on the photographic media. The printer also contains a closed loop calibration system to adjust the length of each image segment.

3 Claims, 9 Drawing Sheets

PARALLEL SEGMENT PRINTING IN A PHOTOGRAPHIC PROCESS PRINTER

CROSS REFERENCE TO RELATED APPLICATION(S)

This is a divisional of copending application Ser. No. 08/639,976 filed on Apr. 29, 1996 and priority is hereby claimed under 35 USC §120.

FIELD OF THE INVENTION

This invention relates to printers for computer systems and more particularly to Cathode Ray Tube (CRT) display subsystems within such printers. Even more particularly, the present invention relates to an apparatus and methods for combining image segments from one or more of such CRT's to permit printing of wide format images.

BACKGROUND OF THE INVENTION

Photographic process printers use a cathode ray tube (CRT) to project an image onto a photosensitive media. After the image is projected onto the media, the media is processed to develop the latent image. In order to transfer the image from the surface of the CRT to the surface of the media while maintaining image focus, prior art devices typically use lenses or an array of optical fibers that are adapted to transfer the light from the surface of the CRT to the surface of the media.

A problem exists when applying this technology to create wide format images on wide format photosensitive media. Large CRTs are inherently complex in their design due to factors relating to the wide ranging sweep of the electron beam within the CRT and the difficulty of manufacturing a large glass envelope. Alternatively, lenses are required to magnify the image of the CRT face, resulting in reduced resolution and increased exposure time. Retaining the quality required for the print process of photographic printer devices requires large CRTs representing significant cost and complexity in the resulting photographic printer device. A practical limit on the CRT width in these applications is less than the width desired for wide format photosensitive media.

One option is to divide the image onto a plurality of smaller CRTs. This option presents problems in that CRTs cannot be physically mounted horizontally or vertically adjacent one another so as to create a seamless image row. All known CRT devices are manufactured with some non-imageable area at their sweep limits. Additionally, physical thickness of the CRT glass envelope material will preclude precise, seamless alignment of the plurality of partial images on the CRTs.

Although optical fibers are one technique used to transfer the image from the projection surface of each CRT onto the surface of the photosensitive media, these fibers must remain short enough to prevent excessive loss of image light intensity. The short length of the optical fibers, and the cost of longer fiber arrays, preclude physical recomposition of the whole image by simply bending the optical fibers so that the fibers at the ends of adjacent partial image segments are abutted.

One prior art system is shown in U.S. Pat. No. 5,373,347 issued Dec. 13, 1994 to Shaklee, et al., entitled "Staggered Multiple CRTs in a Photographic Process Printer", which is incorporated herein by reference for all that is disclosed and taught therein. This system has a limitation in that the print media must be kept very straight as it moves across the staggered CRTs. Any buckling or wobbling of the print paper causes distortion in the output image.

Another limitation of this system is the requirement for precise paper movement, so that the dot rows of vertically spaced CRTs can be aligned on the same dot row of the media.

It is thus apparent that there is a need in the art for an improved method or apparatus which permits efficient transfer of a wide format image onto photosensitive media from a plurality of CRTs. The present invention meets this and other needs in the art.

SUMMARY OF THE INVENTION

It is an aspect of the present invention to provide an apparatus for decomposing a wide format image into partial images on a plurality of CRTs and for transferring the plurality of partial images onto a wide format print media recomposed to form a whole image.

It is another aspect of the present invention to provide lenses and a control mechanism to permit the plurality of partial images on the CRTs to be horizontally or vertically displaced and still recompose the decomposed image to form a whole image.

Another aspect is to provide an apparatus for decomposing a wide format image into partial images displayed on multiple lines of a single CRT and for transferring the plurality of partial images onto a wide format print media recomposed to form a whole image.

A further aspect of the invention is to provide a method of printing images on a media that are wider than the width of a single display device.

The above and other aspects of the present invention are accomplished with a control mechanism and associated control methods which decompose the whole image into image segments. These segments of the whole image are each individually imaged through a separate one of a plurality of small CRTs and through lenses that expand the image to adjust for the separation between the CRTs. The CRTs may be arranged horizontally, vertically, or in two dimensions, and the lenses permit the plurality of CRTs to be separated. The lenses between the plurality of small CRTs and the print media permit the image segments to join one another on the media to form a complete image, either by abutting or overlapping each other. For horizontally or vertically separated CRTs, as the photosensitive media moves across the multiple CRT images the system causes the desired segments of the image rows to be recomposed when transferred to the media. For CRTs arranged in two dimensions, the image segments from CRTs adjacent each other on the axis of the image rows join each other in the manner of horizontally or vertically separated CRTs, while the image rows from CRTs that are perpendicular to the axis of the image rows must align to cause the rows projected by different CRTs to appear adjacent each other. The system provides buffering and associated control methods and circuits to merge the image segments onto the media.

In an alternative embodiment, the invention displays multiple image segments of a single image row at different locations on a single CRT, and through lenses and mirrors, combines these multiple image line segments into a single image row on the media.

In another alternative embodiment, the invention displays sections of the image on the individual CRTS within a two dimensional array of CRTs. The lenses associated with the individual CRTs cause the image to be faithfully reconstructed in its entirety on the photo sensitive media.

The present invention also provides a method of combining multiple image row segments into a single image row by displaying the image segments at multiple locations on one or more display devices, and optically combining the image segments into a single image line.

The invention also provides an apparatus and a method of calibrating the length of the horizontal image segments on each CRT.

BRIEF DESCRIPTION OF THE DRAWINGS

The above and other aspects, features, and advantages of the present invention will be better understood by reading the following more particular description of the invention, presented in conjunction with the following drawings, wherein.

DETAILED DESCRIPTION OF THE PREFERRED EMBODIMENT

The following description is of the best presently contemplated mode of practicing the present invention. This description is not to be taken in a limiting sense but is made merely for the purpose of describing the general principles of the invention. The scope of the invention should be determined by referencing the appended claims.

Figure 1:
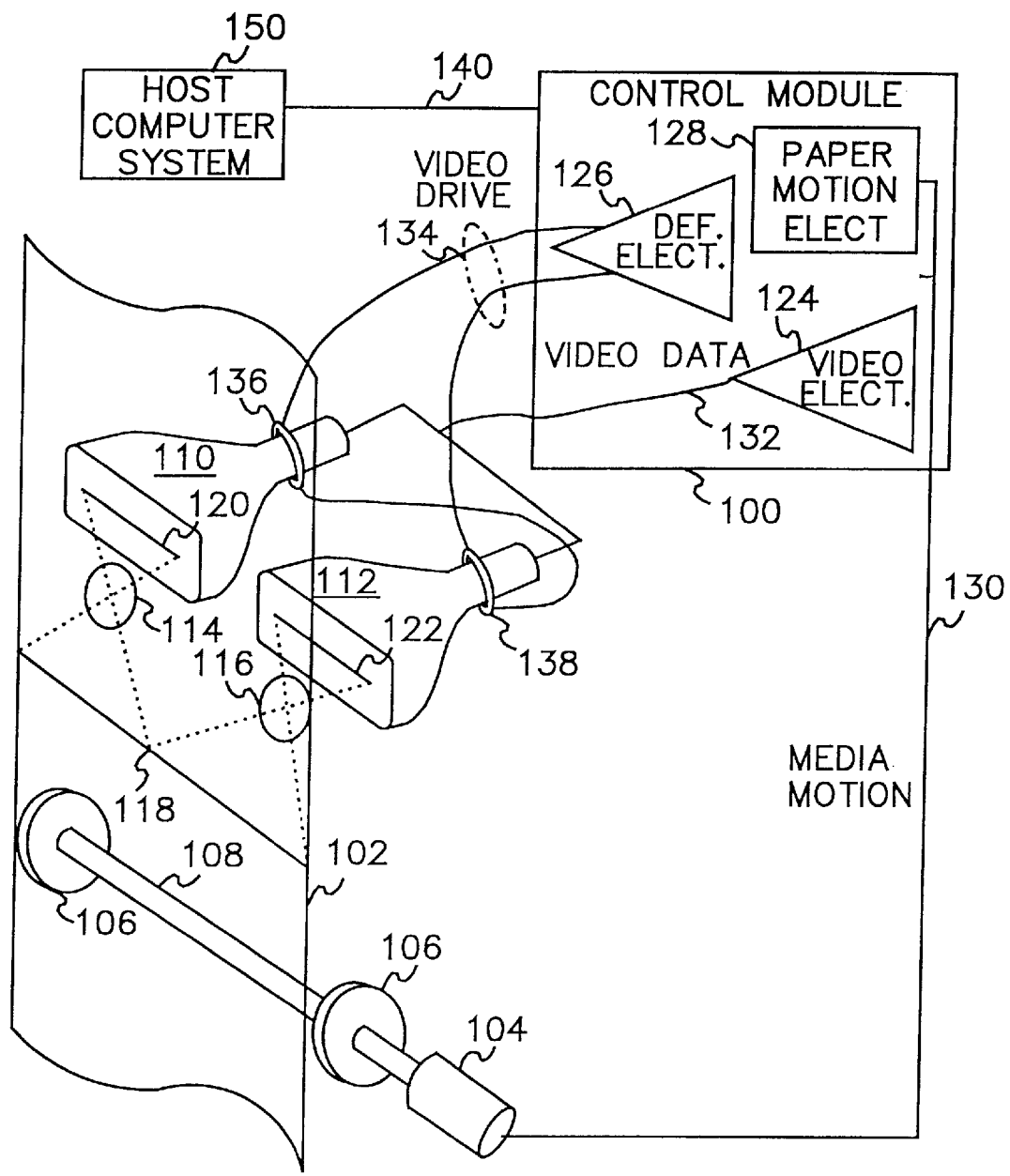
FIG. 1 shows a block diagram of essential elements of a printer incorporating a plurality of horizontally separated CRTs of the present invention.

FIG. 1 shows a block diagram of the essential elements of a printer incorporating the method and apparatus of the present invention. Control module 100 receives image data from a host computer system 150 over host interface 140. The image data received is reproduced on photosensitive media 102 by displaying horizontal image segments of each row of the image on CRTs 110 and 112, which are positioned in close proximity to photosensitive media 102. The image segments are optically projected from the CRTs and combined on the media, one row at a time, as media 102 is moved past the CRTs, until all rows of the image have been reproduced as a latent image on media 102. Media 102 is then moved on to a development process (not shown) to develop and fix the latent image. Those skilled in the art will recognize that the invention will also work with media that does not require development after exposure.

The CRTs 110 and 112 can be arranged horizontally with the media moving vertically across the CRTs or arranged vertically with the media moving horizontally across the CRTs. For simplification, the following discussion is directed to the embodiment wherein the CRTs are arranged horizontally side by side, with the media moving vertically across the CRTS.

In FIG. 1, two CRTs 110 and 112 are shown arranged horizontally, perpendicular to the direction of movement of photosensitive media 102. Lenses 114 and 116 are positioned in front of the surface of CRTs 110 and 112 respectively to focus and transfer the image segments from the surface of the CRT to the photosensitive media 102.

Control module 100, using paper motion electronics 128, controls servo motor 104 through media motion signal 130 to turn shaft 108 clockwise. Drive rollers 106 are attached to shaft 108 and cause photosensitive media 102 to move vertically upward, since media 102 is pinched between drive rollers 106 and opposing pinch rollers (not shown). Image row 118 on media 102 moves vertically upward as media 102 is moved vertically upward by the controlled rotation of drive rollers 106. Control module 100 causes media 102 to move vertically until image row 118 is vertically aligned with horizontal image segment 120 so it can be transferred from the surface of CRT 110 by lens 114. Control module 100 then causes CRT 110 to project the first segment of image row 118 onto media 102 through lens 114. The remaining segment required to complete image row 118 remains buffered within control module 100. During the retrace of CRT 110, control module 100 displays image segment 122 on CRT 112 and this image segment is transferred from the surface of CRT 112 by lens 116 to the media on image row 118. Lenses 114 and 116 optically expand the image segments 120 and 122 to cause these image segments to fully occupy image row 118 on the media 102.

Because the image area of a CRT is less than the physical width of the CRT, in all known currently manufactured CRTs, there will be a horizontal separation between the two image segments 120 and 122. Lenses 114 and 116 are needed to optically expand the image segments 120 and 122 to overcome the separation between the ends of the segments displayed on the two CRTs. Lenses 114 and 116 provide the optical expansion to provide a coarse adjustment of the length of the image segments, and the beam of each CRT is adjusted electrically to provide a fine adjustment of the length of the image segments.

The electron beam deflection drive signal 134 is coupled to the yokes of CRTs 110 and 112 to cause CRT 110 to scan in the forward direction while CRT 112 retraces, and to cause CRT 112 to scan in the forward direction while CRT 110 retraces (see FIG. 3 below). This allows one set of drive electronics 126, and one set of video electronics 124 to drive two CRTs. Those skilled in the art will recognize, however, that two sets of drive electronics and video electronics could be used to allow both CRTS to display simultaneously.

This process is repeated for each row of the entire length of the image to be projected onto media 102.

The two CRTs of FIG. 1 are by way of example only. Those skilled in the art will recognize that any number of CRTs could be used to expose any desired width of media 102, that the media could be moved horizontally across the CRTS, or that the media could be stationary while being exposed, with the CRTs moving across the media in either the horizontal or vertical directions, subject to the limitation that the relative motion between the media and the CRTs must be perpendicular to the axis of the image line segments on the CRTS. Also, multiple rows of CRTs could be used to expose multiple image rows on the media simultaneously.

Figure 2:
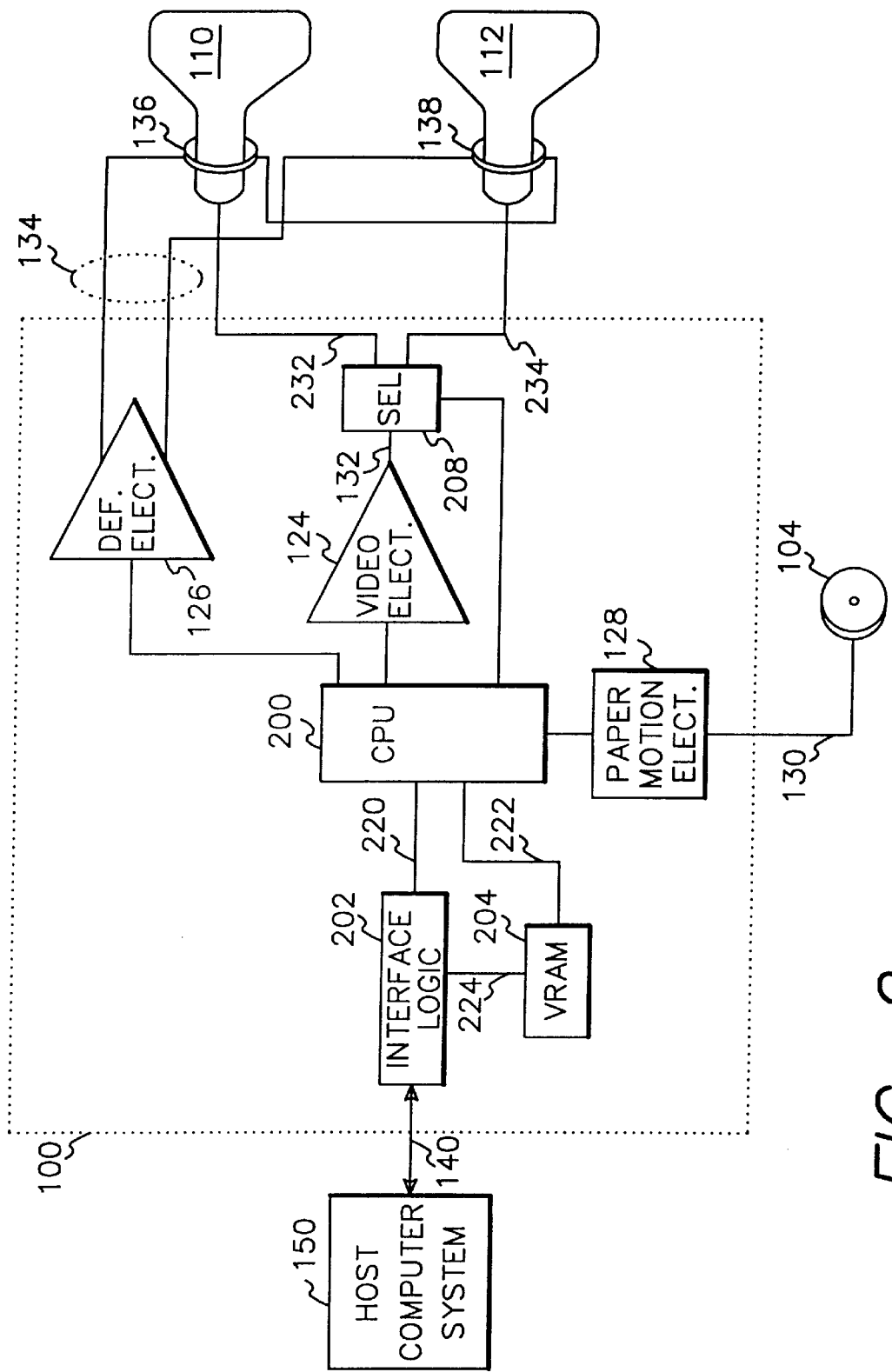
FIG. 2 shows a block diagram of the control module of FIG. 1.

FIG. 2 depicts additional detail of the design and operation of control module 100. Interface logic 202 receives commands and image data applied to host interface 140 by a host computer system 150. The received commands are applied over bus 220 to central processing unit 200 (CPU) for further interpretation and processing. Received image data is applied directly to video RAM 204 (VRAM) by interface logic 202 over bus 224. CPU 200 interprets the host commands received and causes the transfer of the image data from VRAM 204 to CRTs 110 and 112 as required to reproduce the received image on a photosensitive media (not shown in FIG. 2). An apparatus and method for printer speed control based on rate of reception of host supplied image data is taught by Sturm et al. in U.S. Pat. No. 5,077,680 issued Dec. 31, 1993 and is hereby incorporated by reference for all that is disclosed and taught therein. The teachings of Sturm et al. in the '680 patent may be advantageously applied to the present invention to optimize the use of VRAM 204 memory for maximum print speed in view of the host communication rates.

CPU 200 controls servo motor 104 through paper motion electronics 128 over signal 130 to move the media (not shown in FIG. 2) one row at a time vertically across the CRTs 110 and 112. As each row on the media is moved into vertical alignment with the CRTs 110 and 112, the horizontal image segment of the image data for each of the CRTs is transferred by CPU 200 from VRAM 204 to video electronics 124 and through selector 208 to either CRT 110 or CRT 112, as discussed above. The image produced on CRT 110 and 112 is exposed onto the photosensitive media and remains there as a latent image to be developed and fixed. The media is then moved to the next row and the process repeats until all rows of the media have been exposed.

CPU 200 divides each row of image data stored in VRAM 204 into two segments—one for each of CRTs 110 and 112. Each segment of each row in VRAM 204 is transferred to either CRT 110 or 112 over video bus 232 or 234 respectively when the appropriate image segment of the media (not shown) is selected with selector 208. Although the CPU divides each row of image data into segments in the preferred embodiment, those skilled in the art will recognize that the dividing of the data into segments could be performed in the host computer system 150 or by other external circuitry.

FIGS. 1 and 2 show that the yokes 136 and 138 of CRTs 110 and 112 respectively are wired to the deflection electronics amplifier 126 such that the two CRTs will scan in opposite directions when driven by the common deflection amplifier 126. That is, the yokes 136 and 138 are wired to cause CRT 110 to scan in a forward direction while CRT 112 is retracing. Consequently, CRT 112 will scan in a forward direction while CRT 110 is retracing. This allows data to be displayed on one CRT during the normal forward scan time, and it allows data to be displayed on the other CRT during the normal retrace time, thus avoiding any loss of time during retrace. In the preferred embodiment, both CRTs will display data while scanning in the same direction, so that the same physical alignment procedures can be used for both CRTs, however, those skilled in the art will recognize that the CRTS could be allowed to scan in opposite directions.

Figure 3:
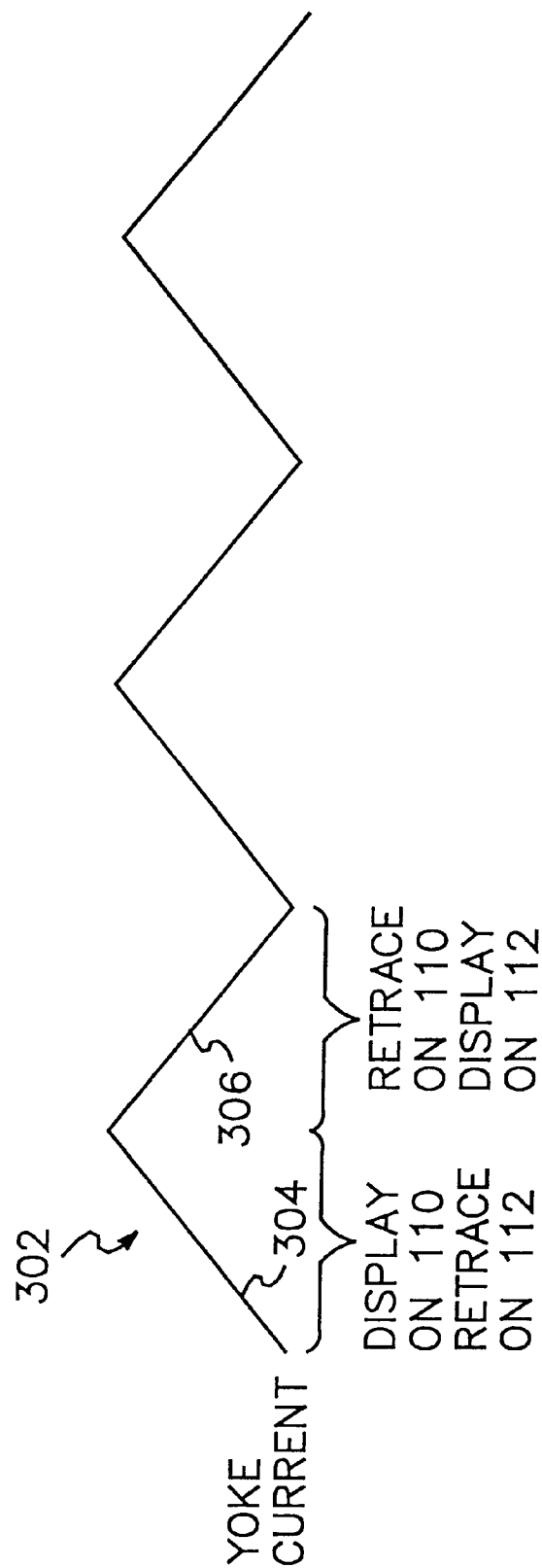
FIG. 3 shows the current waveform for the yoke current of the CRTs of FIGS. 1 and 2.

FIG. 3 shows the waveform for the yoke current in signal lines 134. Referring to FIG. 3, yoke current waveform 302 is shown having current increase through region 304 and decrease through region 306. These regions are repeated periodically. During the current increase region 304, CRT 110 will display data, while CRT 112 will retrace from a previous display. During the current decrease region 306, CRT 110 will retrace, and CRT 112 will display data.

Figure 4:
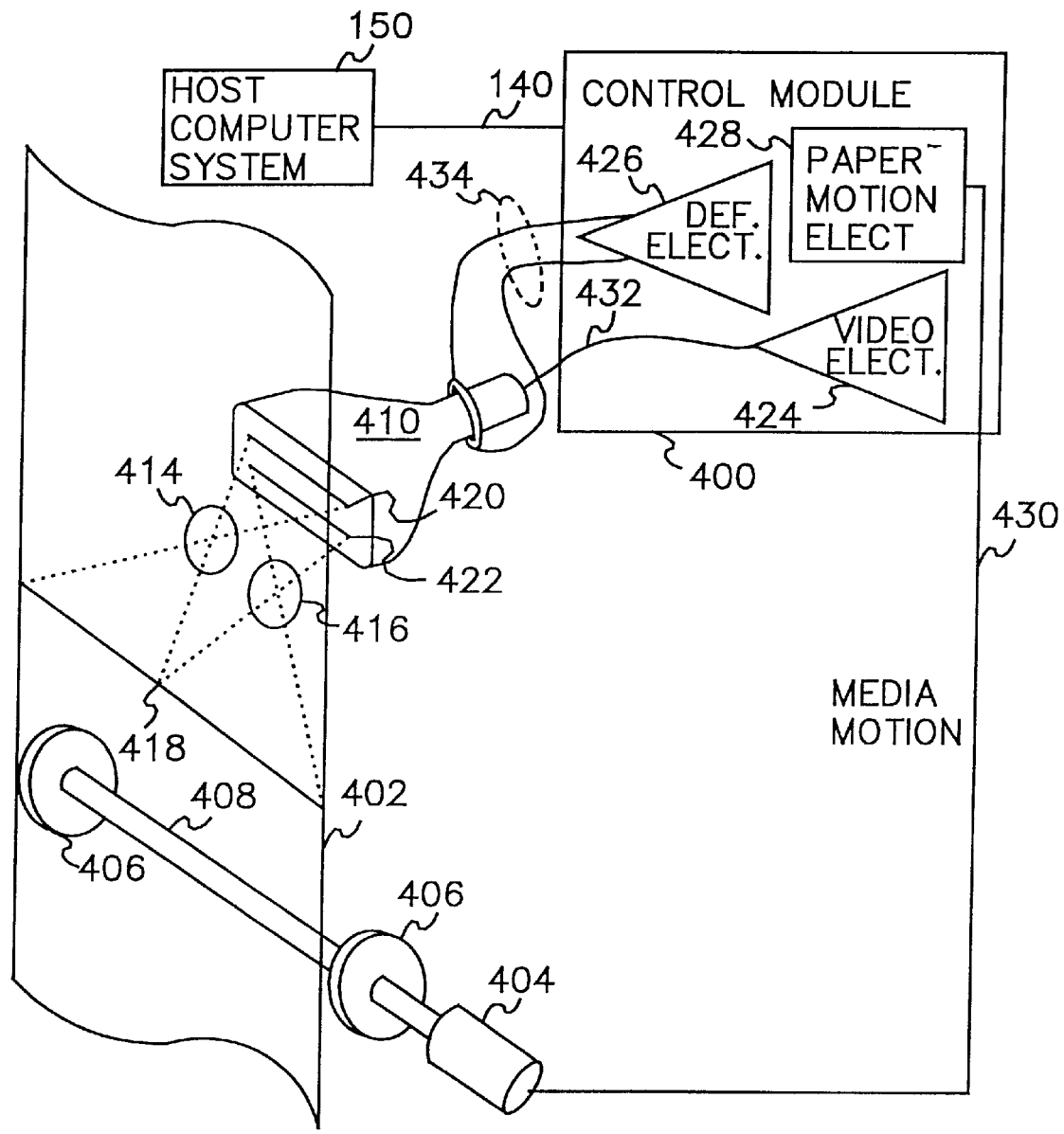
FIG. 4 shows an alternative embodiment of the invention, using a single CRT to display multiple image segments.

FIG. 4 shows an alternative embodiment of the invention, wherein multiple image segments are displayed on a single CRT and then optically combined on the media. Referring to FIG. 4, a single CRT 410 is shown displaying two image segments 420 and 422 while lenses 414 and 416 are positioned in front of the surface of CRT 410 to focus and transfer the image segments 420 and 422 from the surface of the CRT to the photosensitive media 402.

Control module 400, using paper motion electronics 428, controls servo motor 404 through media motion signal 430 to turn shaft 408 clockwise. Drive rollers 406 are attached to shaft 408 and cause photosensitive media 402 to move vertically upward since media 402 is pinched between drive rollers 406 and opposing pinch rollers (not shown). Image row 418 on media 402 moves vertically upward as media 402 is moved vertically upward by the controlled rotation of drive rollers 406. Control module 400 causes media 402 to move vertically until image row 418 is vertically aligned with horizontal image segment 420 so it can be transferred from the surface of CRT 410 by lens 414. Control module 400 then causes CRT 410 to project the first segment of image row 418 onto media 402 through lens 414. The remaining segment required to complete image row 418 remains buffered within control module 400. After displaying image segment 420, control module 400 displays image segment 422 on CRT 410 and this image segment is transferred from the surface of CRT 410 by lens 416 to the media on image row 418.

This process is repeated for each row of the entire length of the image to be projected onto media 402.

Although lenses 414 and 416 may expand the image segments 420 and 422 respectively, as was done with FIG. 1 above, no such expansion is required. CRT 410 may produce each image segment in the same length as required by the media, and no expansion would be required, instead, lenses 414 and 416 would simply vertically displace the images to transfer them to the media 402.

Alternatively, lenses 414 and 416 could de-magnify the image to produce a higher resolution image on a small format medium such as photographic film.

Figure 5:
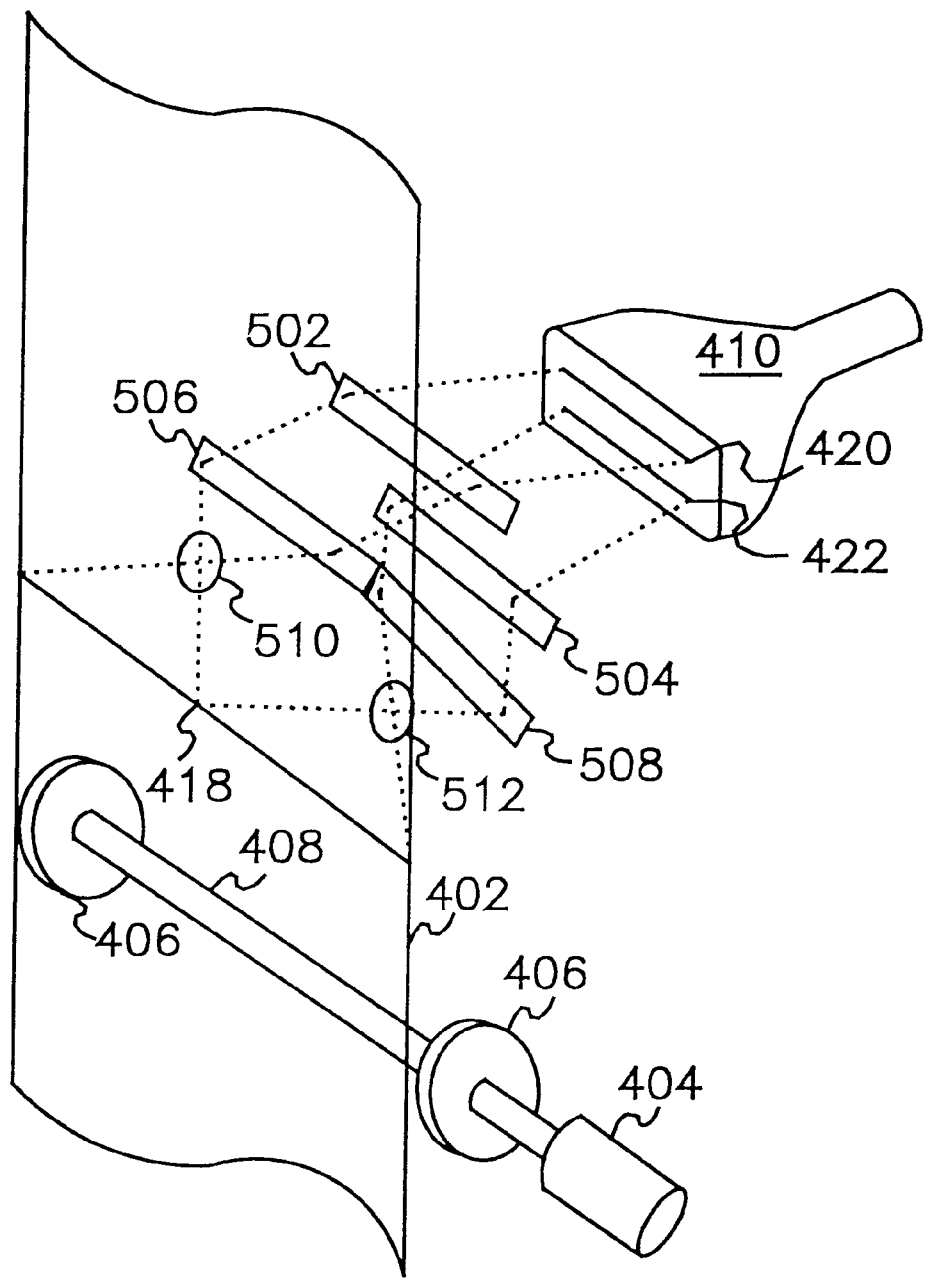
FIG. 5 shows an arrangement of mirrors used in the printer of FIG. 4.

Mirrors may also be used to assist in directing the image segments 420 and 422 from the CRT 410 to the media 402. Such mirrors may assist in achieving more uniform focus of image row 418. FIG. 5 shows a diagram of using mirrors to assist in directing the image to the media. Referring to FIG. 5, light from image segment 420 is reflected by mirror 502 and then by mirror 506 before passing through lens 510 to the row 418 of the media 402. Similarly, light from image segment 422 is reflected by mirror 504 and mirror 508 before passing through lens 512 to the row 418 of the media 402.

Figure 6:
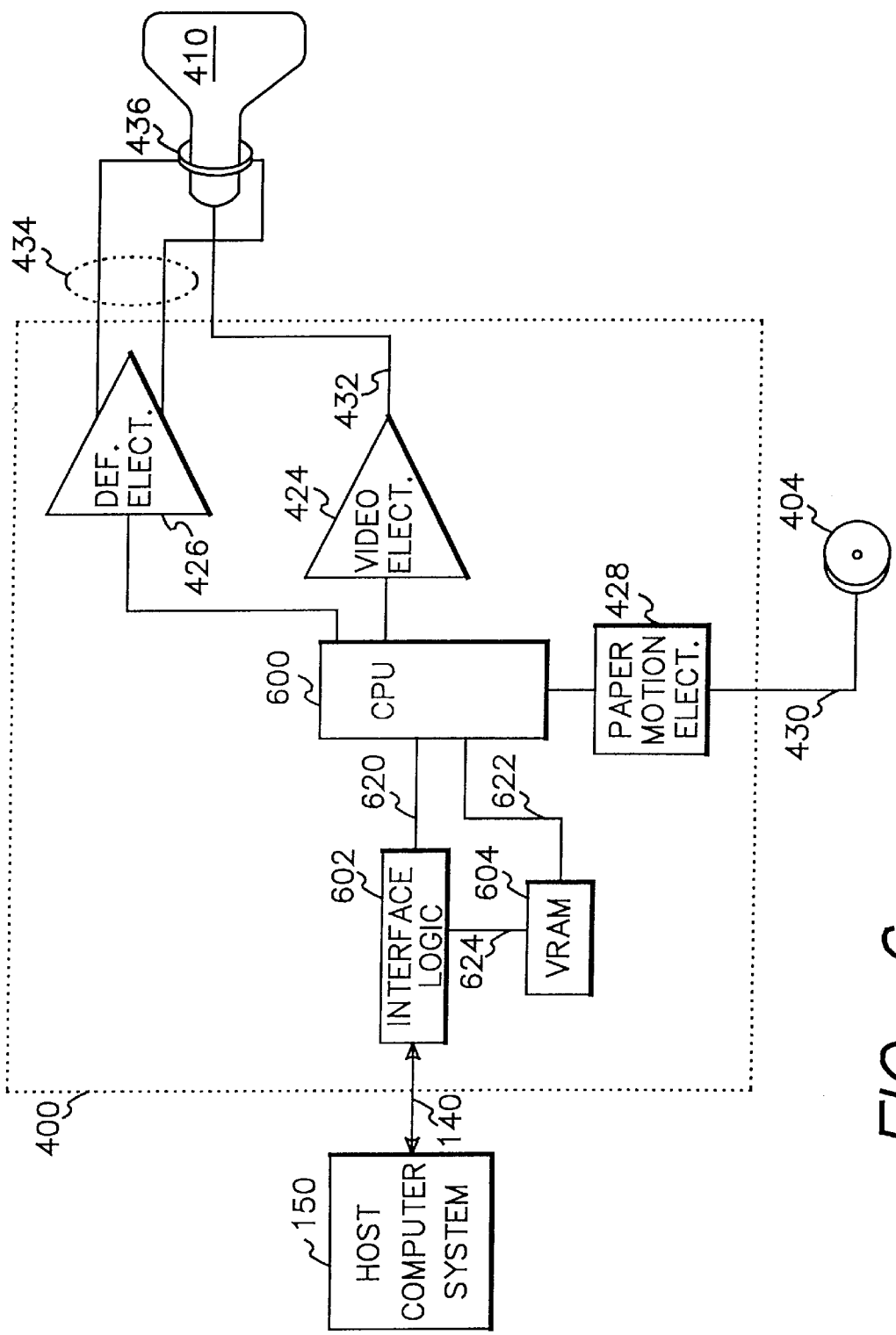
FIG. 6 shows a block diagram of the control module of FIG. 4.

FIG. 6 depicts additional detail of the design and operation of control module 400. Interface logic 602 receives commands and image data applied to host interface 140 by a host computer system 150. The received commands are applied over bus 620 to central processing unit 600 (CPU) for further interpretation and processing. Received image data is applied directly to video RAM 604 (VRAM) by interface logic 602 over bus 624. CPU 600 interprets the host commands received and causes the transfer of the image data from VRAM 604 to CRT 410 as required to reproduce the received image on a photosensitive media (not shown in FIG. 6).

CPU 600 controls servo motor 404 through paper motion electronics 428 over signal 430 to move the media (not shown in FIG. 6) one row at a time vertically across the CRT 410. As each row on the media is moved into vertical alignment with the display lines 420 and 422 and lenses 414 and 416 of the CRT 410, the horizontal image segment of the image data for display line 420 of the CRT 410 is transferred by CPU 600 from VRAM 604 to video electronics 624 to display row 420 of CRT 410, as discussed above. The image produced on display row 420 of CRT 410 is exposed onto the photosensitive media and remains there as a latent image to be developed and fixed.

CPU 600 divides each row of image data stored in VRAM 604 into two image segments—one for each display row 420 and 422 of CRT 410. Each segment of each row in VRAM 604 is transferred to the appropriate display row of CRT 410 over video bus 432. Although the CPU divides each row of image data into segments in the preferred embodiment, those skilled in the art will recognize that the dividing of the data into segments could be performed in the host computer system 150 or by other external circuitry.

Figure 7:
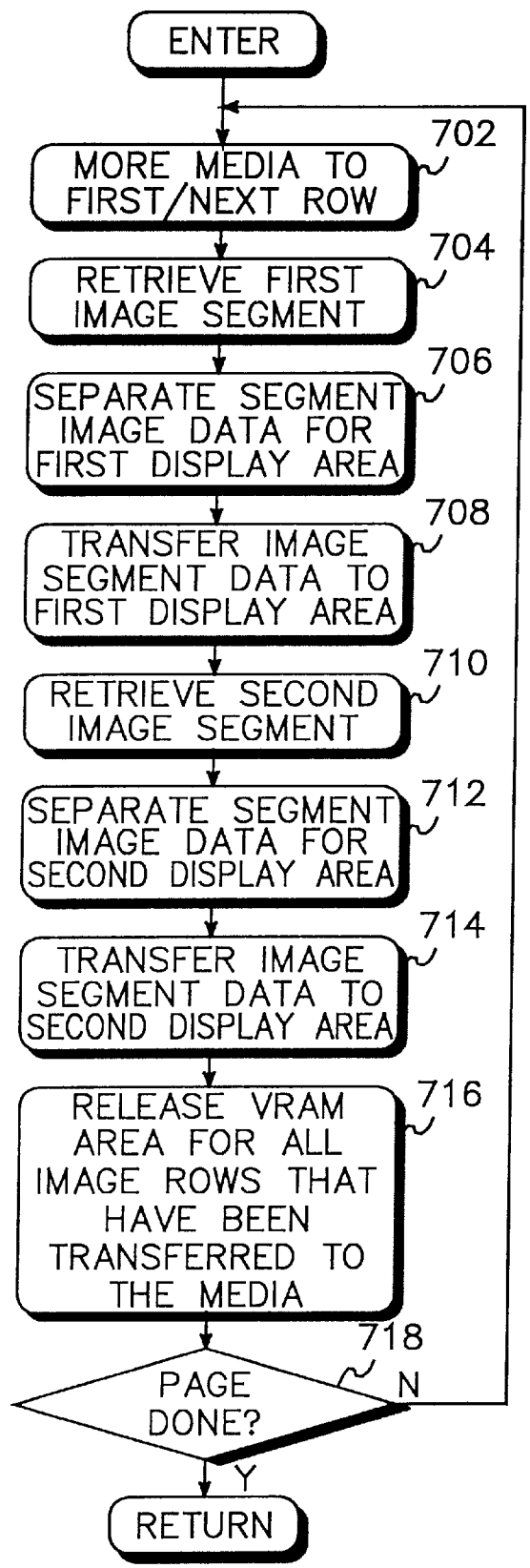
FIG. 7 shows a flowchart of the control methods of the present invention to buffer, and recompose the segmented images using a plurality of separated CRTs or a plurality of image areas on a single CRT.

FIG. 7 shows a flowchart of the control methods applied by either CPU 200 or CPU 600 to create the exposure of CRTs 110 and 112 as shown in FIG. 1 or the exposure of the two line segments on CRT 410 as shown in FIG. 4. The function performed by the steps depicted in the flowchart of FIG. 7 is performed once per page to expose an entire image, dot row by dot row onto photosensitive media 102 or the media 402.

Referring to FIG. 7, after entry, block 702 controls servo motor 104 or 404 to move media 102 or 402 to the start position at the beginning of the media page, or to the next dot row, for exposure of an image by CRTs 110 and 112 or 410. block 704 retrieves image data from the VRAM 204 or 604 for the first segment of the first or next image row. Block 706 then separates the image row data that is to be displayed on the first CRT 110, or the first display row of CRT 410, if the separation had not been performed by the host computer system 150, and block 708 then transferrers this horizontal segment to either CRT 110 or CRT 410.

Blocks 710, 712, and 714 perform the same function for the second CRT 112, or the second display row of CRT 410, that blocks 706, 708 and 710 performed for the first CRT 110. Block 716 frees all areas of VRAM 204 or 604 for image rows for which data has been sent to all the CRTs, since the data for these rows is no longer needed. Block 718 then determines if all dot rows have been processed, and if not, returns to block 702 to process the next dot row. After all dot rows have been processed, block 718 returns to the caller.

Figure 8:
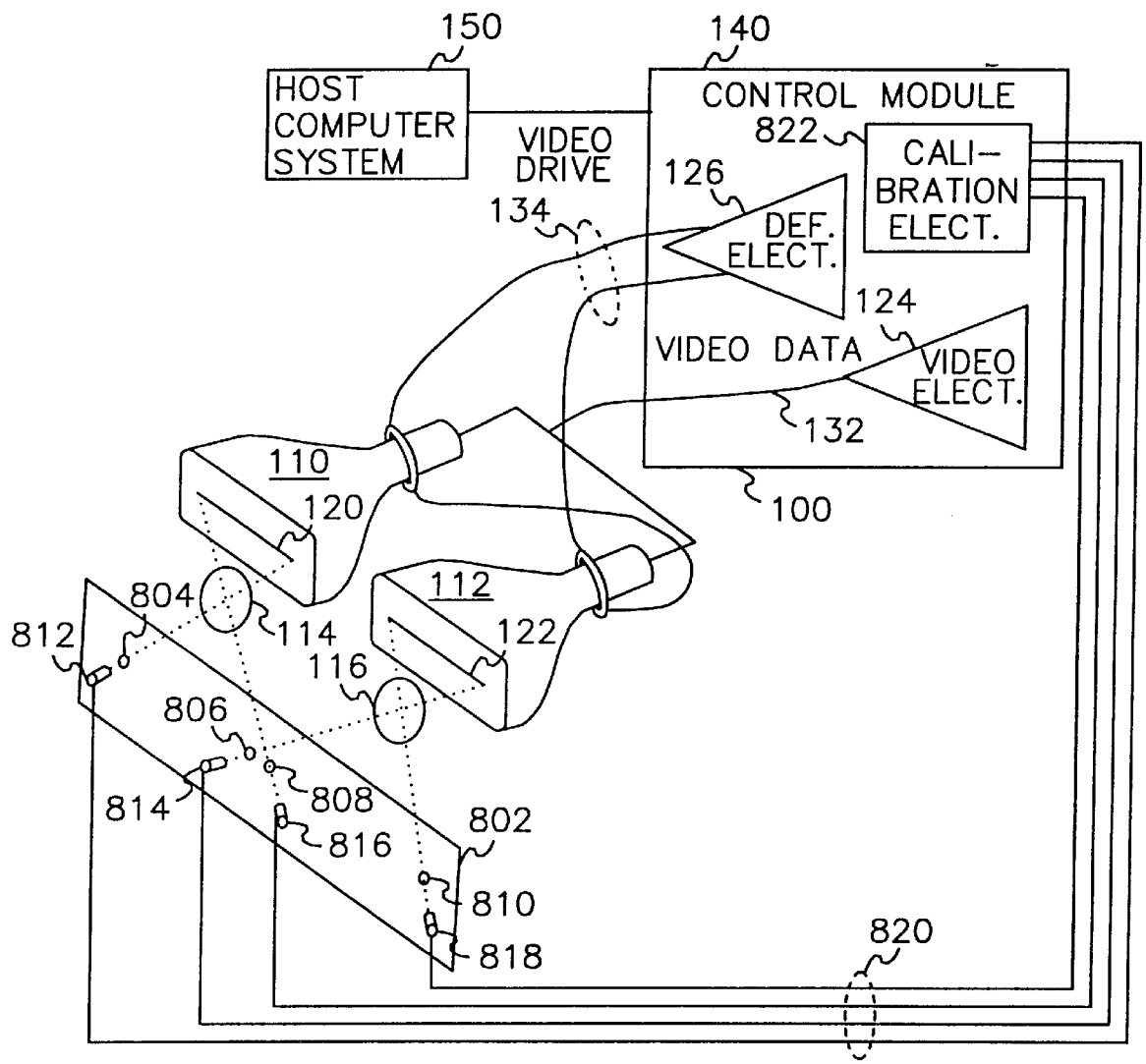
FIG. 8 shows a closed loop calibration system of the invention.

FIG. 8 shows a method of calibrating the CRTs 110 and 112, or the CRT 410. Referring now to FIG. 8, calibration mask 802 is placed behind the media (not shown in FIG. 8) such that when the media is not present, the images from the CRTs will strike the calibration mask 802. Four holes 804, 806, 808, and 810 are placed in the calibration mask 802 to allow the ends of the lines of images from the CRTs to pass through the holes. Four detectors 812, 814, 816, and 818 are located behind the calibration mask 802 and aligned with the images of the ends of the lines that pass through the holes 804, 806, 808, and 810 respectively. Thus, when the display lines 120 and 122 are of the correct length, detectors 812, 814, 816, and 818 will detect the image passing through the holes 804, 806, 808, and 810. Signal lines 820 transfer the detector outputs to the control module 100 and to the calibration electronics 822. Calibration electronics 822 transfers the detected signals to the CPU 200 or CPU 600 (not shown in FIG. 8). Thus, by displaying a line of data on the CRTs, and gradually widening the length of the line until the detectors detect the ends of the line, the CRTS can be calibrated to display the correct line length. This widening can be done either by adjusting the deflection electronics 126 to cause the beam width to change.

Those skilled in the art will recognize that this method could be extended to any number of CRTs, wherein two holes would be present in mask 802 for each CRT, and a detector would be located behind each hole. Alternatively, each of the detectors could be replaced by a plurality of detectors, horizontally aligned, to provide data indicating various widths of each line.

Other methods of creating a closed loop calibration of the CRTs could also be used, such as a single detector at the point where the images converge. Also, a single detector, or multiple detectors, that detect light reflecting from the media could be placed on the same side of the media as the CRTs are located to perform the calibration dynamically with media present.

Figure 9:
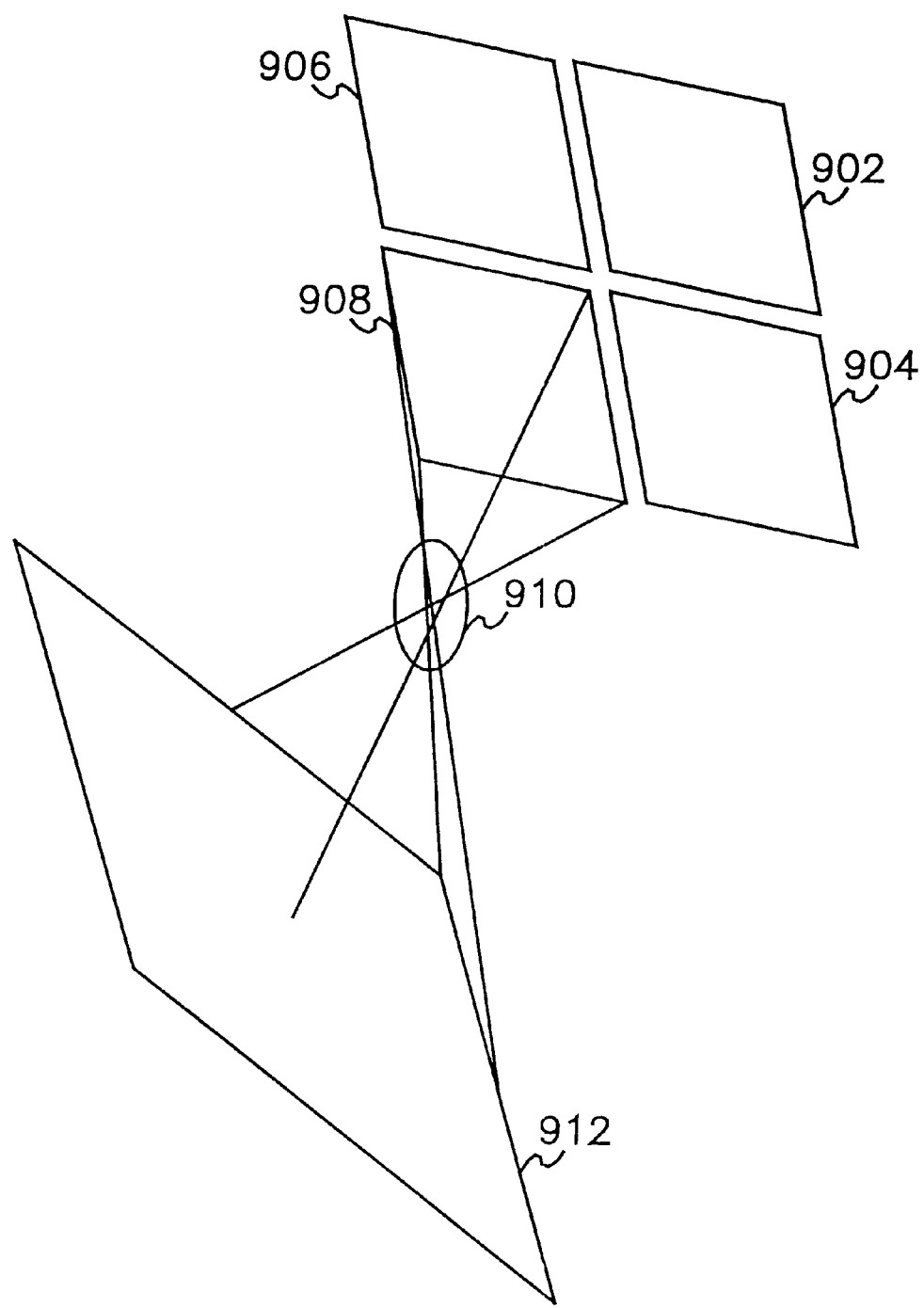
FIG. 9 shows a two dimensional array of CRTS projecting an image onto a sheet of photosensitive media.

FIG. 9 shows an alternative embodiment wherein CRTs are arranged in a two dimensional array to project an image onto a sheet of media. Referring to FIG. 9, several CRTs 902, 904, 906, and 908 are shown arranged in a two dimensional array. Each of the CRTs 902, 904, 906, and 908 forms part of an image for a single sheet of media 912. For example, CRTs 906 and 902 form image segments that are joined when the segments are projected onto the media 912. Lens 910 is shown projecting the image from CRT 908 onto a portion of the media 912. In practice, a separate lens would be used for each CRT to project its image onto the media 912.

Although the invention has been described using CRTs to project an image onto media, the invention is not so limited. Other techniques for transferring an image to media, such as laser, piezo electric shutter, deformable mirror devices, light emitting diodes, liquid crystal, or plasma panels could also be used with the invention. The invention is usable in any application wherein more than one printing or exposure device is used to place a single image onto a medium and the size or location of segments of the image are adjusted as the image is transferred from the display device to the medium.

Having described a presently preferred embodiment of the present invention, it will now be appreciated that the aspects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably, defined in scope by the following claims.

What is claimed is:

1. A printer for transferring image data from a host computer system to expose a print media to form an image thereon, said printer comprising:

a memory for storing said image data;

a host interface for receiving said image data transferred from said host computer system and storing said image data into said memory;

a display device for displaying a plurality of image segments of each row of said image data, wherein each image segment is displayed at a separate location on said display device;

a plurality of image transfer devices, one for adjusting each image segment of said image data displayed by said display device to cause said image segments to join and form image rows on said media, thus recomposing each row of said image data as said image segments are transferred to said media, wherein all image segments are transferred to a single image row before any image segments are transferred to a subsequent image row; and a processor operatively engaged with said memory and with said display device for retrieving said plurality of image segments from said memory, and for transferring each of said plurality of image segments to a separate location on said display device thereby to transfer said image segments to said media; and a closed loop calibration system for calibrating the length of each image segment, wherein said closed loop calibration system comprises at least one detector for detecting an end of at least one image segment.

2. The printer of claim 1 wherein said processor further decomposes said image data into said plurality of image segments.

3. The printer of claim 1 wherein said processor further comprises a controller for adjusting a width of each of said plurality of image segments as each of said plurality of image segments is displayed to cause each of said plurality of image segments to join with an adjacent image segment on said media.

* * * * *